(12) United States Patent
Redmann et al.

(10) Patent No.: US 8,511,539 B2
(45) Date of Patent: Aug. 20, 2013

(54) METHOD AND APPARATUS FOR PARKING LOT METERING

(75) Inventors: William Gibbens Redmann, Glendale, CA (US); Chris Outwater, Santa Barbara, CA (US)

(73) Assignee: Liberty PlugIns, Inc., Santa Barbara, CA (US)

( * ) Notice: Subject to any disclaimer, the term of this patent is extended or adjusted under 35 U.S.C. 154(b) by 69 days.

(21) Appl. No.: 12/659,666

(22) Filed: Mar. 16, 2010

(65) Prior Publication Data

US 2011/0226848 A1    Sep. 22, 2011

Related U.S. Application Data

(63) Continuation-in-part of application No. 12/659,376, filed on Mar. 5, 2010.

(60) Provisional application No. 61/252,909, filed on Oct. 19, 2009.

(51) Int. Cl.
*G06F 17/00* (2006.01)

(52) U.S. Cl.
USPC ............... 235/375; 235/462.01; 235/462.09

(58) Field of Classification Search
USPC .......... 235/375, 380–382.5, 384, 449, 462.01
See application file for complete search history.

(56) References Cited

U.S. PATENT DOCUMENTS

| | | | | |
|---|---|---|---|---|
| 4,532,418 A | * | 7/1985 | Meese et al. | 235/381 |
| 5,519,260 A | * | 5/1996 | Washington | 307/10.5 |
| 5,648,906 A | * | 7/1997 | Amirpanahi | 705/418 |
| 5,742,229 A | * | 4/1998 | Smith | 340/438 |
| 5,914,654 A | * | 6/1999 | Smith | 340/438 |
| 6,081,205 A | * | 6/2000 | Williams | 340/932.2 |
| 6,614,204 B2 | * | 9/2003 | Pellegrino et al. | 320/109 |
| 7,209,903 B1 | * | 4/2007 | Mamdani et al. | 705/75 |
| 2004/0181496 A1 | * | 9/2004 | Odinotski et al. | 705/418 |
| 2004/0181671 A1 | * | 9/2004 | Brundage et al. | 713/176 |
| 2007/0299684 A1 | | 12/2007 | Goodwin | |
| 2009/0216687 A1 | * | 8/2009 | Burdick | 705/418 |
| 2010/0191585 A1 | * | 7/2010 | Smith | 705/13 |
| 2010/0241542 A1 | * | 9/2010 | Pinkusevich et al. | 705/34 |
| 2011/0011930 A1 | * | 1/2011 | Starr et al. | 235/382 |
| 2011/0068739 A1 | * | 3/2011 | Smith | 320/109 |

* cited by examiner

*Primary Examiner* — Tuyen K Vo
(74) *Attorney, Agent, or Firm* — John R. Kasha; Kelly L. Kasha; Kasha Law LLC

(57) ABSTRACT

Pay-by-Space and Pay-and-Display are two well-known systems for metered parking for multiple spaces. The present invention allows multi-space meters to separately manage and control electric vehicle charging located in conjunction with parking spaces. Control is implemented by the meters printing indicia on a parking pass or receipt for the parking patron to present to an electric vehicle charging system able to read the indicia. Each such ticket may initiate a predetermined interval of charging, or an interval of charging selected by the patron during a transaction with the meter. The indicia may be either human-readable (e.g., text) or machine-readable (e.g., a barcode), or both, and may be encrypted to resist fraud. Data representative of the indicia may also be made available from an online server and delivered to a parking patron's smartphone or other portable device, whereby the display of the smartphone may present the indicia for reading by the electric vehicle charging system.

19 Claims, 3 Drawing Sheets

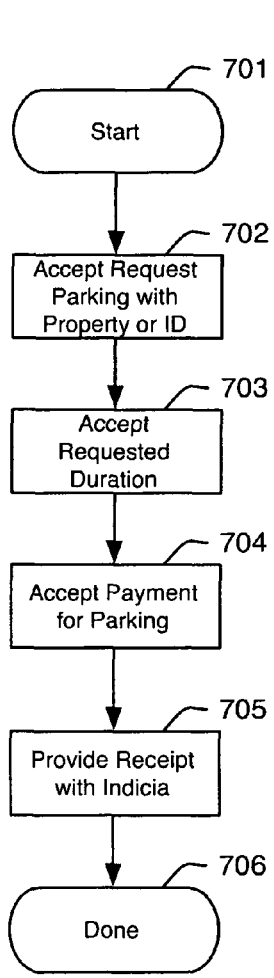
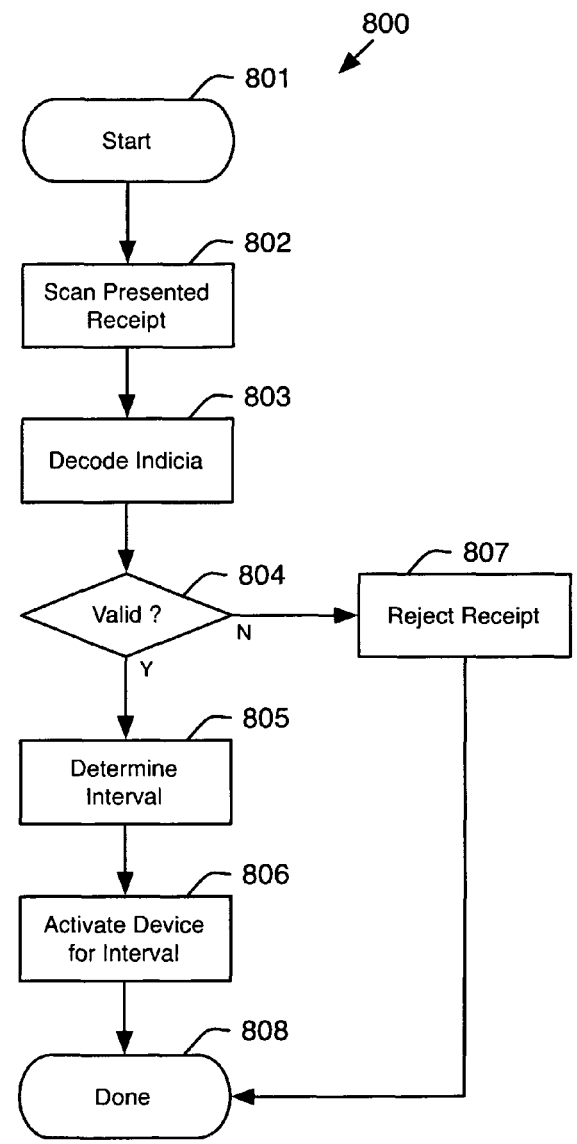
Figure 7
Figure 8

METHOD AND APPARATUS FOR PARKING LOT METERING

CROSS REFERENCE TO RELATED APPLICATION

This application is a continuation-in-part application of U.S. patent application Ser. No. 12/659,376, filed Mar. 5, 2010, entitled "METHOD AND APPARATUS FOR PARKING LOT METERING," which claims the benefit of U.S. Provisional Patent Application No. 61/252,909, filed Oct. 19, 2009, entitled "METHOD AND APPARATUS FOR PARKING LOT METERING." All of the above mentioned applications have common inventorship with the present application and are incorporated by reference herein in their entireties.

FIELD OF THE INVENTION

The present invention relates generally to a system and method for a parking meter to manage one or more electric vehicle charging stations. More specifically, the present invention relates to a system and method wherein a parking meter provides a printed receipt usable to activate an electric vehicle charging station.

STATEMENT REGARDING FEDERALLY SPONSORED RESEARCH OR DEVELOPMENT

Not Applicable

REFERENCE TO COMPUTER PROGRAM LISTING APPENDICES

Not Applicable

BACKGROUND OF THE INVENTION

There are a growing number of plug-in electric vehicles (PEVs) and plug-in hybrid vehicles (PHEVs) on the roads of the world. For the sake of this discussion, we refer to all of these vehicles simply as electric vehicles, or EVs. This growing population of EVs will require a rich charging environment, allowing them to plug in and charge under various conditions and times and places during the night and day.

Several companies have begun to supply charging site infrastructure for EVs. These companies are providing their own infrastructure for metering, timing, and billing their customers. These companies often revenue share with city government or private parking lot owners.

EV charging is intrinsically tied to parking: other than hybrid-electric vehicles, EVs must be parked to be charged, and even PHEVs exhibit better economy and a lower carbon footprint when charged from the plug rather than from their fuel-driven generator.

A change occurring in the parking meter industry is being driven by the high cost of infrastructure and the need for more efficient ways to designate, control, and enforce metered parking spaces. This change is a move away from single-space (i.e., one meter per parking space) to multi-space metered parking. "Multi-space" is a general industry term designating as few as one, but often several strategically located payment centers or kiosks, each kiosk serving multiple parking spaces in its proximity, perhaps redundantly.

There are two basic methods currently employed for using a central kiosk-based, multi-space system: one is "pay-by-space" and the other is "pay-and-display".

Pay-by-space parking requires each parking space to have a unique, corresponding number. A customer parks a vehicle in a parking space, notes the number of the parking space, and proceeds immediately to a nearby payment kiosk. At the kiosk, the customer is asked to input the number of the parking space, select an amount of time required, and then pay an appropriate fee, typically using any of several payment methods, including credit card. The customer does not need to return to the vehicle to display a receipt. With pay-by-space, parking enforcement officers can visit the kiosk or otherwise (e.g., though a wireless connection) obtain from the kiosk a list of spaces that should be empty. Vehicles inappropriately occupying a space that should be empty may be ticketed.

Pay-and-display parking does not require parking spaces to be numbered. Instead, a customer parks a vehicle in a parking space and proceeds immediately to a nearby payment kiosk. The customer selects only the amount of time required and pays an appropriate fee, choosing from several payment options as with pay-by-space. The customer is issued a receipt that is date and time stamped and indicates the amount of time purchased. More specifically, the receipt indicates when the amount of time purchased will expire. However, since the kiosk is unaware of which space is being used, the customer must return to the vehicle and leave the receipt on the dashboard so that it is clearly displayed through the windshield. With pay-and-display, parking enforcement officers do not need to visit the kiosk, but instead simply look for and ticket vehicles having either no receipt, or whose receipt has expired.

OBJECTS AND SUMMARY OF THE INVENTION

The present invention attempts to adapt and make use of existing infrastructure resources, rather than to add expensive new infrastructure.

The present invention allows EV charging and billing to be integrated into new or existing parking meter systems with special emphasis on the newer credit card based, central kiosk, multi-space parking technology.

The present invention operates with either multi-space parking method (pay-and-display or pay-by-space), allows EV charging and billing where available, and offers control over EV charging stations without the addition of hardware to the central kiosk. The following discussion independently examines embodiments of the invention for each parking method.

Pay-by-Space

In this case, the pay-by-space customer would be driving an EV and would be canvassing the parking lot or parking spaces on the street, looking for signage indicating an EV charge enabled parking space. When an open space is found, the customer would park the vehicle and note the unique ID for the space (e.g., the parking space number).

At this point, the customer can plug in a charge cord for charging the EV. Alternatively, this step may be performed upon return to the vehicle following customer's transaction at the payment kiosk.

The customer would then proceed to the payment center kiosk and input the appropriate space number.

The kiosk, based on its database, would know that that unique number corresponds to an EV charging space.

In one embodiment, the kiosk may notify the customer and confirm that this is an EV charging space. If customer confirms, then the kiosk can display the times and parking fees for that space.

In such an embodiment, the kiosk may restrict issuance of the parking space, if as a matter of policy parking in that space is reserving for EVs, either all of the time, or for certain hours. If the customer indicates that no EV charging will be used, the kiosk cancels the transaction.

In an alternative embodiment, the kiosk does not specifically notify or confirm that this is an EV charging space.

As a matter of policy, there may be a premium attached to parking in the EV space and/or for use of the EV charging unit. Further, such premium may only be for certain hours, e.g., for those hours when EV charging is in greatest demand, or for those hours when charging is available. This will be flexible and programmable within the context of the software of the billing kiosk and central billing network.

In general, the customer completes a financial transaction through the kiosk for an interval of parking and EV charging. The duration of the interval may be predetermined and fixed (e.g., "one-hour", or "all-day"), or the duration may be entered by the customer, subject to policy constraints (e.g., "not to exceed three hours"). At the conclusion of the transaction, the kiosk provides a receipt to the customer comprising an indicia suitable for reading by the EV charging unit.

The customer returns to the EV charging unit and presents the receipt so that an indicia reader associated with the EV charging unit can read the indicia from the receipt. In response to having been presented with the indicia, the EV charging unit becomes enabled for the duration of the interval and the customer's electric vehicle receives electricity for charging.

Pay-and-Display

With the pay-and-display system, the appropriate EV parking spaces would be designated in the marked for EV charging.

The kiosk is programmed to know that some spaces within its area are EV enabled, but does not know if the customer chose one of those spaces. The kiosk must query the customer as an initial step in the transaction: Is your space EV enabled? If the response from the customer is "Yes", then the kiosk shows the appropriate time and fee schedule for an EV charging space, otherwise the non-EV schedule is shown.

After the customer has completed the payment transaction, a receipt is printed and provided that the customer must display in the vehicle's window. If parked in an EV space, the receipt must have a mark or code designating payment for an EV enabled space. Perhaps it might be as simple as a large "EV" printed at the top or bottom. Additionally, this receipt (or a second receipt provided) comprises an indicia, as above, suitable for being read by an EV charging station.

This method has the slight drawback that, barring additional description for a unique charging station, the indicia provided should be able to enable any of the charging stations to be managed by the kiosk providing the receipt. If the customer were so disposed, the receipt could end up being used to activate each of the charging stations nearby. However, since the parking spaces are being managed under pay-and-display rules, only one vehicle will ultimately be displaying the receipt issued, any other vehicle parked at an inappropriately enabled EV charging station would be in violation, whether or not the charging station had been enabled.

A drawback that inhibits wide adoption of electric vehicles is the lack of infrastructure for conveniently charging them; and while hybrid electric vehicles are increasingly popular, plug-in versions that operate to maximize use of their battery and minimize use of their gasoline-fueled generator are rare, in part due to the same lack of infrastructure.

Provision of a vehicle charging infrastructure is inhibited primarily by cost: Such infrastructure has been expensive, typically requiring allocation of a physical location that vehicles can access and providing new electric service to that location.

The present invention allows the management of one or more EV charging stations with a minimum of communications infrastructure required. The charging station must be outfitted with an indicia reader having connection with which to enable the EV charging circuit.

In an alternative embodiment, the financial transaction can be conducted through the Internet, rather than at a kiosk. In this embodiment, data representative of the transaction is provided to the customer's portable computer, PDA, cell phone, or smartphone. At the EV charging station, the data representative of the transaction is used to render an indicia on the display of the customer's device, to be read by the EV charging station as above.

BRIEF DESCRIPTION OF THE DRAWINGS

The aspects of the present invention will be apparent upon consideration of the following detailed description taken in conjunction with the accompanying drawings, in which like referenced characters refer to like parts throughout, and in which:

FIG. 7 is a flowchart for a process for a transaction to obtain parking and the use of a device (e.g., an EV charger) under the present invention; and, FIG. 8 is a flowchart for a process of activation of a device (e.g., an EV charger) associated with a parking space.

While the invention will be described and disclosed in connection with certain preferred embodiments and procedures, it is not intended to limit the invention to those specific embodiments. Rather it is intended to cover all such alternative embodiments and modifications as fall within the spirit and scope of the invention.

DETAILED DESCRIPTION OF THE INVENTION

Figure 1:
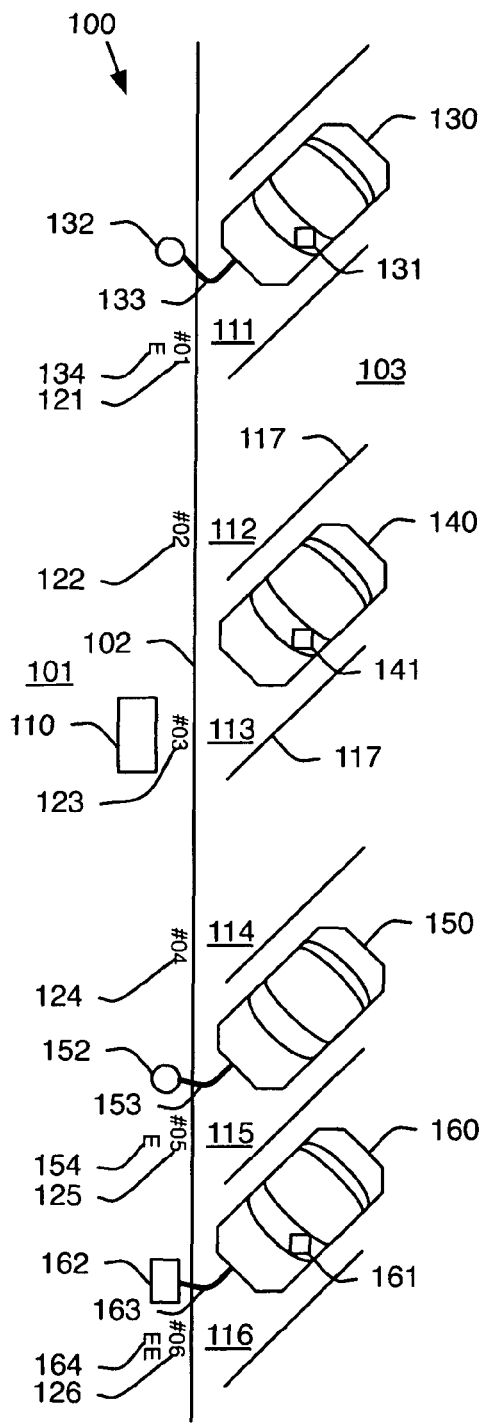
FIG. 1 is a plan view of a parking area under management of the present invention.

Referring to FIG. 1, sidewalk 101 is separated from street 103 by curb 102. Parking area 100 comprises parking spaces 111-116. The parking spaces are divided from each other by lines 107 painted in the street. Payment terminal 110, located on sidewalk 101 in proximity to parking spaces 111-116, manages parking area 100 either alone or in conjunction with other terminals or remote systems (not shown).

Currently, four of parking spaces 111-116 are occupied: space 111 is occupied by vehicle 130, space 113 is occupied by vehicle 140, space 115 is occupied by 150, and space 116 is occupied by vehicle 160.

Depending on the mode of operation, a vehicle may display a parking pass provided by payment terminal 110 on its dashboard. In FIG. 1, three of the four vehicles are displaying a parking pass: vehicle 130 is displaying parking pass 131, vehicle 140 is displaying parking pass 141, vehicle 160 is displaying parking pass 161. Vehicle 150 is not displaying a parking pass.

Also depending on the mode of operation, each parking space 111-116 may be uniquely identified. In FIG. 1, each parking space 111-116 bears corresponding unique identification indicia 121-126. For example, space 112 bears the number "#02" as shown by identification indicia 122.

Some spaces have particular properties. For example, spaces 111 and 115 are adjacent to streetlights 132 and 152 respectively, each having outlets for charging electric vehicles. In this example, these outlets are Level 1 charging outlets, providing about 1,500 W of electrical power, which can charge a typical electric vehicle in about 8 hours. Space 116 is adjacent to a high-capacity charging station 162 for charging electric vehicles. Level 2 chargers, such as station 162, can provide from about 3,000-20,000 W and can charge a typical electrical vehicle in 30 minutes to 4 hours, depending on the particular voltage and current available. While the outlets near spaces 111, 115, and 116 are all suitable for charging electric vehicles, the high charge rate of charging station 162 makes it suitable for a quick charge, and this is a property of space 116 not conferred (in this example) by the outlets on streetlights 132 and 152 to their corresponding spaces 111 and 115.

In FIG. 1, the vehicles parked in spaces 111, 115, and 116 are shown plugged into the corresponding charging outlets on streetlights 132 and 152, and charging station 162 with corresponding cables 133, 153, and 163.

In some modes of operation, spaces 111 and 115 are marked with property indicia 134 and 154, respectively, to indicate their property of Level 1 electric vehicle charging. In this example, property indicia 134 & 154 is a single letter "E". Similarly, space 116 is marked with property indicia 164 to indicate its property of Level 2 electric vehicle charging, which herein is shown as "EE".

Parking spaces may have other properties. For example, and not by way of limitation, a parking space may have an electrical outlet to be used for engine block heating during extremely cold weather, or a parking space may be covered, a premium in hot or stormy weather.

Such properties may be valuable at anytime (e.g., electric vehicle charging), or only in certain conditions (e.g., engine block heater). On a mild spring day there may be no value to an engine block heater or having a covered parking spot.

Parking spaces lacking exceptional properties such as those mentioned have the property of being ordinary. Such spaces may be marked with a property indicia (not shown) corresponding to being ordinary spaces.

Figure 2:
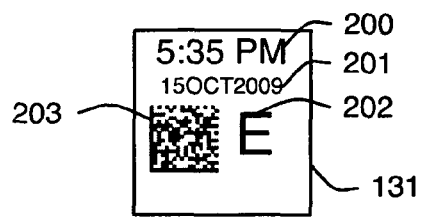
FIG. 2 is a ticket for electric vehicle parking having human-readable and machine-readable indicia.

FIG. 2 shows a pass 131 provided by kiosk 110 and displayed in vehicle 130, showing human-readable indicia such as the time of expiration 200, the date of issue 201, and property indicia 202 corresponding to the kind of space 111, an "E" for Level 1 electric vehicle charging. In some embodiments, pass 131 may also comprise an identification indicia (not shown) corresponding to identification indicia 121.

Additionally, machine-readable indicia 203 may be provided, in this example representing the time of expiration 200, date of issue 201, and space number 121, "#01". In this example, machine-readable indicia 203 is a 2D barcode of the type called Data Matrix, as described in ISO/IEC 16022, published by the International Organization for Standardization (ISO), of Geneva, Switzerland. In this example, machine-readable indicia 203 includes error correction codes, to make it more reading by a machine more reliable. Other choices machine-readable indicia may be used instead. In this case, barcode 203 contains the text "010910151735" which is of the form "ccyymmddhhmm" where "cc" is a EV charging station identifier (in this case, for charge station 132, which corresponds with identification indicia 121), "yymmdd" is the year, month, and day, and "hhmm" is the time at which the charging should stop, coincident with the expiration of the pass to park.

Note that, as use herein, the terms "human-readable indicia" and "machine-readable indicia" are used to distinguish between two kinds of indicia. Herein, "human-readable indicia" refers to indicia intended to be readily readable by humans, such as a text or symbology whose meaning is casually apparent to most of the adult human population, at least those familiar with the language or symbology used and having adequate vision. This is to distinguish from "machine-readable indicia," intended to be scanned and read by a machine and not designed for convenient reading by humans. Machine-readable indicia, often comprised of dots, stripes, patterns, or encrypted text or other symbols (e.g., a barcode intended to be read by a barcode scanner), are generally difficult for human readers, even though the meaning is decipherable by humans having time, expertise, and perhaps a codex for the symbology. The distinction as used herein is one of the intent with which the indicia is created (convenient reading by humans vs. convenient reading by machines), since machines are increasingly able to usefully read some instances of human-readable indicia, while, as just mentioned, humans having particular training can read machine-readable indicia.

Figure 3:
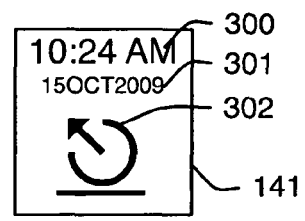
FIG. 3 is a ticket for parking without electric vehicle charging.

FIG. 3 shows a pass 141 provided by kiosk 110 and displayed in vehicle 140, showing human-readable indicia representing the time of expiration 300, the date of issue 301, and since space 113 is an ordinary parking space, instead of a property indicia corresponding to kind, a clock face 302 shows a graphical version of the time of expiration 300.

In an alternative embodiment, all passes could show a clock face such as 302 to illustrate expiration time.

Figure 4:
FIG. 4 is another ticket for electric vehicle parking having human-readable and machine-readable indicia.

FIG. 4 shows a pass 161 provided by kiosk 110 and displayed in vehicle 160, showing human-readable indicia representing the time of expiration 400, the date of issue 401, and property indicia 402 corresponding to the kind of space 116, an "EE" for Level 2 electric vehicle charging. Additionally, machine-readable indicia 403 may be provided, in this example representing the time of expiration 400, date of issue 401, and space number 126, "#06". The barcode 403 represents the text "060910150945", which provides the same information as expiration time 400 and date 401, and also the device number "06" for charger 162.

Figure 5:
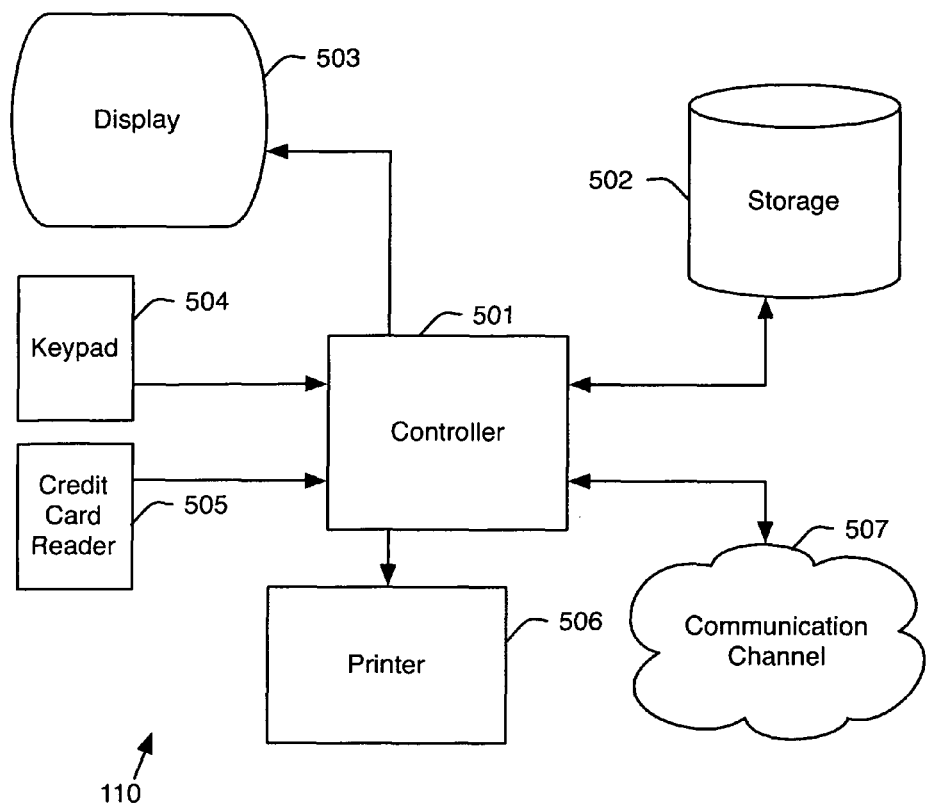
FIG. 5 is a payment kiosk for managing a parking area and providing receipts.

FIG. 5 is a block diagram suitable for implementing the payment station kiosk 110. A controller 501 has access to storage 502, a display 503 or other user interface output device, keypad 504 or other user interface input device (e.g., a touchscreen, not shown), a credit card reader 505 or other payment acceptance device (e.g., an RFID reader, coin or bill acceptor, etc.), a printer 506 for printing parking passes and/or receipts.

In some embodiments, controller 501 may have communication through a channel 507, for example to allow remote management (e.g., allowing an administrator to monitor the operations of terminal 110 or to modify data in storage 502), access to remote data tables (e.g., to update tables kept locally in storage 502, or to upload a snapshot of current status), or to allow remote reporting (e.g., to a terminal belonging to a parking enforcement officer), or allow remote payment (e.g., to a service accessed from a motorist's cell phone), or to communicate with a remote payment service (e.g., a credit card bureau).

Figure 6:
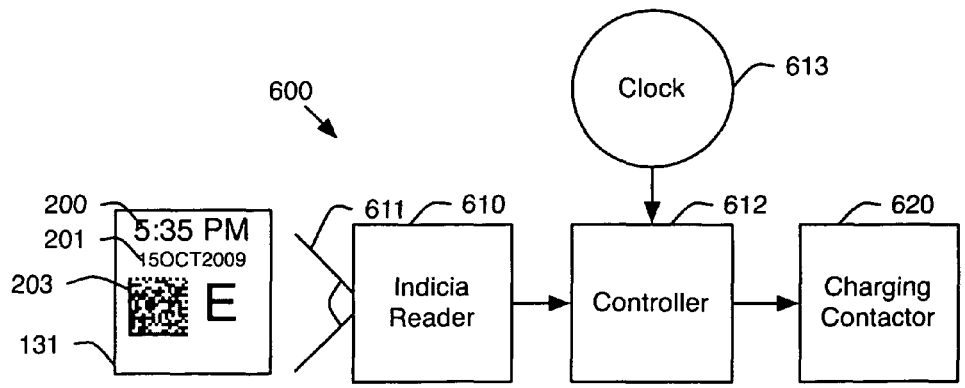
FIG. 6 is a block diagram for an indicia-reading EV charging station of the present invention.

In the present invention, controller 501 prints indicia (e.g., either human-readable expiration time 200, or machine-readable indicia 203, or both) onto a parking pass (e.g., 131) or receipt such that at least a portion of the indicia is readable by indicia reader 610 of charging station 600, as shown in FIG. 6. When properly presented within range and within field-of-view 611 of indicia reader 610, at least some of the indicia are read by reader 610, appropriately decoded, and provided to controller 612.

In one embodiment, indicia reader 610 comprises a barcode scanner or reader, in which case machine-readable indicia 203 would be a barcode (not shown), which is passed, decoded, to controller 612.

In the embodiment shown, indicia 203 is a 2D barcode, in this example a Data Matrix barcode as described in ISO/IEC 16022 and indicia reader 610 comprises a digital camera able to resolve a 2D barcode and a decoder, such as the IS4920 manufactured by Honeywell Scanning & Mobility, of Blackwood, N.J. The indicia reader 610 communicates the decoded contents of successfully read machine-readable indicia 203 to controller 612.

In another embodiment, indicia reader 610 may comprise just a digital camera in communication with controller 612, and controller 612 may execute software able to decode machine-readable indicia 203 from the images captured by and transferred from the camera.

In still another embodiment, indicia reader 610 comprises a camera, but controller 612 comprises optical character recognition (OCR) software to analyze the image and decode images of human-readable indicia 200 and perhaps human-readable indicia 201.

Upon receiving or producing the decoding of the indicia read, controller 612 determines for how long contactor 620 should be enabled. For example, if clock 613 indicates that it is currently 4:35 PM and human-readable expiration time indicia 200 or machine-readable indicia 203 is read with reader 610 and decoded to indicated that EV parking has be paid though 5:35 PM, then controller 612 determines that contactor 620 should be enabled for one hour, or until 5:35 PM.

In some embodiments, the all or part of the indicia on pass 131 may be encrypted, signed (i.e., provided with a hash or checksum that is encrypted by an accepted authority), or checksummed (i.e., provided with a checksum), to make creation of a counterfeit pass difficult. For instance, the contents of machine-readable indicia 203 may be encrypted, for example with the public key of a signing authority for which controller 612 possesses the private key. In another embodiment, machine-readable indicia 203 or the human-readable indicia presented on the pass may further comprise a checksum obtained using a shared-secret algorithm known to controllers 501 and 612, to demonstrate that the pass indicia were generated by a legitimate source. Such verification details may be time varying (i.e., changing from day to day, or by time of day), or vary by installation (e.g., the checksum algorithm for parking area 100 might be different than that for a different parking area) to help confound attempts to counterfeit passes.

In some embodiments, pass 131 may comprise no indicia indicative of expiration time or duration, and controller 612 may operate instead to initiate a charging interval of a predetermined duration, or until a predetermined time. This embodiment would be appropriate if there were a single price for a predetermined parking interval (e.g., parking for one hour, or all-day parking with the lot closing at 8:00 PM) In such a case, pass 131 may comprise a unique pass identifier indicia (not shown), which allows controller 612 to ignore subsequent presentations of a pass, or to display the ID of the pass that enabled the current parking interval (display not shown).

In some embodiments, indicia reader 610 may comprise a proximity detector (not shown), to detect the presence of parking pass 131 in or near field-of-view 611. Detection by the proximity detector would trigger one or more attempts to read indicia on parking pass or receipt 131. Such a proximity detector may be used as a low power detector for the presence of a possible indicia bearing object, rather than continuously using reader 610 and controller 612 to detect the presence of valid indicia, which may use a more power.

Contactor 620 enables charging of a connected EV, and operates at the command of controller 612. When contactor 620 is enabled, an EV (e.g., 130) properly connected with a cable (e.g., 133) to an instance (e.g., 132) of charging station 600, is able to charge. In some embodiments, a telltale (not shown) may indicate the status of contactor 620 or of other charging equipment activated by contactor 620.

FIG. 7 shows a parking transaction process 700, which may be used for either pay-and-display or pay-by-space. The process starts at 701, usually (though not necessarily) with the parking patron having already parked a vehicle in a particular parking space and approaching a parking kiosk to engage in this transaction.

In step 702, the parking management system (typically the kiosk) accepts a request for parking from the patron, which may include a parking space identification (e.g., the number from identification indicia 121) for a pay-by-space transaction, or a property of the parking space (e.g., Level 1 EV charging) for a pay-and-display transaction. If the kiosk is only supporting parking spaces having common properties, then for pay-and-display, the property is not needed as part of the request. The request may be entered using keypad 504, or touchscreen (not shown) on display 503. The system's readiness to accept a parking request would be shown on display 503.

In step 703, the system accepts a duration for parking, unless the duration is predetermined (e.g., one hour, or all-day). The duration may be provided as an end time (e.g., until 5:00 PM) or as a length of time (e.g., ninety minutes). The duration can be provided by the patron using keypad 504, or touchscreen. If a duration is needed, the system can request it using display 503.

If parking is not free, then in step 704, the system accepts payment or account information that the patron presents. The system may accept payment with credit card reader 505, or other means (not shown) such as a coin or bill acceptor, a value card or smartcard reader (the value of which may be decremented), or a reader for a form of identification (e.g., an employee card or an RFID tag) that indicates the patron is entitled to parking or that otherwise identifies an account to be billed. If needed the system can request payment and indicate the amount paid so far and the amount remaining using display 503. If needed, communication channel 507 may be used while accepting payment, for example to contact a credit card service. The parking request, duration, and payment information may be recorded in storage 502 for later reporting.

Once the parking request with property (if needed), duration (if needed), and payment (if needed) have been accepted, the system provides at step 705 a receipt or parking pass (e.g., 131, 161) having machine-readable and/or human-readable indicia which indicia reader 610 can read. The receipt or parking pass is provided with printer 506. In embodiments having predetermined durations and properties, the parking pass provided may be pre-printed and is dispensed to the patron without use of print 506.

The parking transaction process 700 is completed at 706.

FIG. 8 shows activation process 800, in which a device, for instance the EV charging station, is enabled for an interval determined by the receipt provided from parking system transaction 700.

Activation process 800 starts at 801 with the patron having received a receipt bearing the appropriate indicia. In step 802, the receipt is scanned by indicia reader 610 when presented by the patron. The indicia is decoded in step 803. In the example shown of machine readable indicia 203, this includes decoding the 2D barcode representation back into the original text.

At step 804, a check is made to determine whether the decoded values are valid. As previously described, in this example barcode 203 contains the text "010910151735" of the form "ccyymmddhhmm" where "cc" is a EV charging station identifier (in this case, for charge station 132, which corresponds with identification indicia 121), "yymmdd" is the year, month, and day, and "hhmm" is the time at which the charging should stop, coincident with the expiration of the pass to park. In this case, the validity check may check to see that the station identifier (the "cc" field of the text) corresponds to this station (e.g., station 132 would find the "01" acceptable, because that is the identifier 121 of station 131. However, station 162 would deem that receipt to be invalid, since its identifier 126 is "06"). The validity check may also determine that the "yymmdd" field corresponds to today's date by checking clock 613. If the dates match, then the date field is acceptable, otherwise the receipt is invalid because the ticket isn't for today. If the expiration time "hhmm" has passed, according to clock 613, then the receipt is invalid for having expired. If the indicia on the presented receipt contain checksums, codes, digital signatures, or encrypted elements, these are tested as appropriate. If any validation measure detects an invalid receipt, the activation process 800 rejects the receipt at step 807. If the device (e.g., charging station 600) has a display or indicator lights (neither shown), the reason for the rejection may be shown to the patron. Otherwise, the receipt presented by the patron and read by the indicia reader 610 is considered valid.

At step 805, the appropriate interval is determined from the values decoded from the reading of the indicia, unless the system uses a predetermined interval. If the value is an end time, as in the "hhmm" field above, and a duration is needed, the duration can be obtained by taking the current time from the clock 613 and subtracting it from the end time provided by the indicia, to produce a duration for activation. Similarly, if the value decoded from the indicia is a duration (not shown) and an end-time is needed, the end time would be the sum of the duration added to the current time from clock 613.

In step 806, controller 612 enables the output circuit (e.g., EV charging circuit contactor 620) by setting a timer (whether implemented in hardware or software) for the interval determined. Upon expiration, the timer will disable the output (e.g., contactor 620). The timer may disable the output when the end time is reached on clock 613, or the timer may be set to hold the output enabled for the duration determined, depending upon implementation. In this way, contactor 602 for electric vehicle charging, or another controlled property, is activated for the appropriate interval, whether expressed by an end-time or a duration, in accordance with the implementation.

In an alternative embodiment, parking transaction process 700 may be conducted without the patron directly approaching parking system kiosk 110. For example, using a personal computer, PDA, cell phone, or smartphone, the patron may communicate with the parking system controller 501 (which may be implemented in a remote server rather than kiosk 110 located in parking area 100) through communication channel 507, which may comprise the Internet, or (if the implementation is inside of kiosk 110) merely a local wireless network, such as a WiFi or Bluetooth connection. Through communication channel 507, controller 501 prompts for and accepts the parking request with property (if needed), duration (if needed), and payment (if needed). If the transaction is being conducted from a location not near parking area 100, then a start time may also be prompted for and accepted from the patron. In step 705, data representative of the receipt or parking pass is provided to the patron's computer, cell phone or smartphone. Such data may be a digital image, or may be a data object to be rendered as an image by an application running on the patron's computer, PDA, or phone. In one embodiment, the image may be printed by the patron, for presentation to indicia reader 610 and for dashboard placement in a pay-and-display situation. In another embodiment, the image may be displayed on a screen of the patron's cell phone or smartphone and the screen displaying this image presented by the patron to indicia reader 610. In embodiments where indicia reader 610 is configured to accept human-readable indicia, the data representative of the receipt may be provided as text, for example an SMS message or email, which can then be printed or displayed on a screen for presentation to indicia reader 610. This method allows a patron to complete the parking system transaction 700 either in advance of arriving at parking area 100, or while still in his vehicle upon first parking in parking area 100. In this embodiment, immediately upon exiting his car, a patron can present his printout, or the screen of his PDA, cell phone, or smartphone within the field-of-view 611 of indicia reader 610 at activation process step 802, instead of visiting kiosk 110 and returning with a receipt from printer 506 of kiosk 110. Otherwise, activation process 800 proceeds as described.

Various additional modifications of the described embodiments of the invention specifically illustrated and described herein will be apparent to those skilled in the art, particularly in light of the teachings of this invention. It is intended that the invention cover all modifications and embodiments, which fall within the spirit and scope of the invention. For example, while many of the foregoing embodiments used a 2D barcode as an exemplary machine-readable indicia, those skilled in the art will recognize that other forms of indicia can be used to achieve the results of the present invention. Thus, while preferred embodiments of the present invention have been disclosed, it will be appreciated that it is not limited thereto but may be otherwise embodied within the scope of the following claims.

We claim:

1. A system for charging electric vehicles comprising:
   a charger for an electric vehicle;
   a reader that reads an indicia when said indicia is presented and determines an interval for electric vehicle charging from said indicia, wherein the interval is encoded into the indicia; and
   a timer that is set to hold the charger enabled for said interval for electric vehicle charging in response to a signal from said reader after said indicia is read.

2. The system of claim 1 wherein said reader reads a duration for charging from said indicia and said charger is enabled for the duration for charging.

3. The system of claim 1 wherein said timer comprises a clock, said reader reads an expiration time for charging from said indicia, and said charger is enabled until the expiration time for charging.

4. The system of claim 1 wherein said indicia comprise a barcode and said reader is one of a barcode reader and a 2D barcode reader.

5. The system of claim 1 wherein said indicia comprise printed text and said reader comprises a camera connected to a processor, said camera providing an image of said indicia to said processor, said processor having optical character recognition software for reading said text from said image.

6. The system of claim 1 wherein said indicia are at least partially one of encrypted, signed, and checksummed.

7. The system of claim 1 wherein said indicia are printed by a pay-and-display parking kiosk.

8. The system of claim 1 wherein said reader is associated with a parking space ID and only provides said signal to said timer when said indicia indicate the parking space ID.

9. The system of claim 8 wherein said indicia is printed by a pay-by-space parking kiosk.

10. The system of claim 1 wherein said indicia are presented on one of a cell phone, PDA, or smartphone.

11. A method for charging electric vehicles comprising the steps of:
  a) providing a charger for an electric vehicle;
  b) automatically reading an indicia and determining an interval for electric vehicle charging from said indicia with a reader when said indicia is presented, wherein the interval is encoded into the indicia; and
  c) setting a timer to hold said charger enabled for said interval for electric vehicle charging in response to step b).

12. The method of claim 11 wherein said indicia comprise one of a barcode and a 2D barcode.

13. The method of claim 11 wherein said indicia comprise text and said automatic reading comprises the use of a camera connected to a computer running optical character recognition software able to read the text.

14. The method of claim 11 wherein said indicia are at least partially one of encrypted, signed, and checksummed.

15. The method of claim 11 wherein said reader is associated with a parking space ID and step c) is performed only if said indicia indicate the parking space ID.

16. The method of claim 11 wherein said indicia are presented one of a cell phone, PDA, or smartphone.

17. A method for charging electric vehicles comprising the steps of:
  a) automatically reading a parking pass with a reader of a charger for an electric vehicle when said parking pass is presented;
  b) automatically determining with a controller of the charger having communication with the reader whether said parking pass is valid;
  c) if said parking pass is not valid, rejecting said parking pass; and
  d) if said parking pass is valid, automatically enabling the charger with said controller for one of a pre-determined interval for electric vehicle charging and an interval for electric vehicle charging indicated by said parking pass.

18. The method of claim 17 wherein said parking pass is provided by a parking transaction system, and wherein the automatically determining step automatically determines whether said parking pass is valid without reference to said parking transaction system.

19. The method of claim 17 wherein the automatically determining step automatically determines whether said parking pass is valid based on at least one value read from said parking pass selected from a group consisting of a checksum, a digital signature, a station identifier, a date, and a time.

* * * * *